US006855056B2

(12) United States Patent
Inoue

(10) Patent No.: US 6,855,056 B2
(45) Date of Patent: Feb. 15, 2005

(54) SYMBOL DISPLAY DEVICE FOR GAME MACHINE

(75) Inventor: Haruo Inoue, Tokyo (JP)

(73) Assignee: Dragon, Co., Ltd., Tokyo (JP)

(*) Notice: Subject to any disclaimer, the term of this patent is extended or adjusted under 35 U.S.C. 154(b) by 0 days.

(21) Appl. No.: 10/625,523

(22) Filed: Jul. 24, 2003

(65) Prior Publication Data

US 2004/0150161 A1 Aug. 5, 2004

(30) Foreign Application Priority Data

Jan. 31, 2003 (JP) ....................................... 2003-024744

(51) Int. Cl.[7] .......................... G07F 17/34; A63F 13/08

(52) U.S. Cl. ....................... 463/31; 463/20; 273/143 R; 273/142 H; 273/142 HA

(58) Field of Search ................. 463/20, 31; 273/143 R, 273/142 H, 142 HA

(56) References Cited

U.S. PATENT DOCUMENTS 5,096,196 A * 3/1992 Gutknecht et al. .... 273/142 HA
6,105,962 A * 8/2000 Malavazos et al. ..... 273/143 R
6,398,220 B1 * 6/2002 Inoue ..................... 273/142 R
2002/0151339 A1 * 10/2002 Huang ......................... 463/12
2003/0027628 A1 * 2/2003 Luciano ....................... 463/20

FOREIGN PATENT DOCUMENTS

GB 2201821 A * 9/1988 ........... G07F/17/34
JP 7-612 1/1995
JP 2002-224265 8/2002

* cited by examiner

*Primary Examiner*—Benjamin Layno
(74) *Attorney, Agent, or Firm*—Young & Thompson

(57) ABSTRACT

First-third light emission parts, wherein plural LEDs are disposed, are provided in front surface of a first display plate. Synchronized with the rotation of the first display plate, the LEDs in the light emission part light on and off to display symbols or images by utilizing afterimage effect. When the first display plate stops rotation, the first-third light emission parts are lighted on and off sequentially. When one of the first to third light emission parts is lighted on, an amount of dividend coins is determined by the numbers on a second display indicated by the lighted light emission part and a fixed indicator. Thus, the LEDs in the light emission part are used not only as image display device but as an indicator.

20 Claims, 14 Drawing Sheets

SYMBOL DISPLAY DEVICE FOR GAME MACHINE

BACKGROUND OF THE INVENTION

1. Field of the Invention

The present invention relates to a symbol display device, mounted in a game machine, to display information of the game.

2. Description Related to the Prior Art

There are symbol display device for a game machine that rotates a mechanical reel having symbols arranged on the periphery thereof, or uses display devices such as CRT or liquid crystal display to simulate the rotation of the reel. As described in Japanese Patent Laid-Open Publications No. H07-000612 and 2002-224265, some symbol display devices have a light emission diode (LED) array to display symbols based on afterimage effect.

A roulette game machine has a rotary disk type symbol display device that rotates a rotary disk on which plural symbols are arranged. After the rotary disk stops the rotation at a predetermined timing, the symbol display device determines the win or the loss in accordance with the symbol indicated by an indicator. Such rotary disk type symbol display device is mounted in a Pachinko game machine or a slot game machine to determine the amount of dividend coins or the odds of the dividend coins in a sub game, for example.

Japanese Patent Application No. 2002-370702, filed by the applicant, describes a rotary disk type symbol display device for a roulette game machine that displays symbols or messages by utilizing afterimage effect of the LED array. The rotary disk type symbol display device is composed of a large rotary disk that carries symbols on the periphery thereof and a small rotary disk with the LED array. The large rotary disk and a small rotary disk are placed concentrically. While the rotary disk is rotating, the symbol display device drives the LED array to display symbols or messages by utilizing afterimage effect. Thereby, it is possible to provide various display patterns that improve appeal effect to a player.

In the rotary disk type symbol display device, however, afterimage effect is utilized only to display the symbols or messages that do not affect the result of the game. Thus, such symbol display device can not provide various game types, since the game result is determined in the same way as the symbol display device without utilizing afterimage effect.

SUMMARY OF THE INVENTION

An object of the present invention is to provide a symbol display device for game machine that can provide various game types by use of an LED array.

Another object of the present invention is to provide a symbol display device that can provide various display patterns to improve appeal effect to a player.

In order to achieve the above objects, the symbol display device of the present invention lights on and off light emission elements of a light emission element array on a rotary member to display symbols or messages by utilizing afterimage effect while the rotary member is rotating, and the light emission elements lights on to indicate a symbol of the symbol display member and/or to display a specific symbol when the rotary member stops rotating. The symbol display device has at least one symbol display member with a symbol area having plural symbols thereon in the front side. The symbol display member is overlapped with the rotary member.

In a preferred embodiment, the light emission element array is provided in an area that does not overlap with the symbol area of the symbol display member. The light emission element arrays are arranged on the rotary member such that each of the light emission element array extends radially to indicate the symbol in the symbol area, and turn the light on and off sequentially when the rotary member stops rotation. The rotary member may be placed behind the symbol display member such that the light emission element array is overlapped with a transparent area of the symbol display member.

The light emission element array may be partially overlapped with the symbol area. In that case, the light emission elements are divided into a first light emission element group that overlaps the symbol area and a second light emission element group that does not overlap the symbol area. When the rotary member is rotating, all of the light emission elements light on and off to display symbols or messages by utilizing afterimage effect. When the rotary member stops rotating, the first light emission element groups or the second light emission element group is lighted on to indicate a symbol.

The symbol display member and the rotary member may have different shapes. It is also possible that the rotary member is in a shape of rectangular. The rotary member may swing clockwise and counterclockwise within a predetermined angle.

According to the present invention, since the light emission element array is lighted on and off to display an image by utilizing afterimage effect and to determine the result of the game, it is possible to provide various game types as well as various display patterns to improve appeal effect to a player.

BRIEF DESCRIPTION OF THE DRAWINGS

One with ordinary skill in the art would easily understand the above-described objects and advantages of the present invention when the following detailed description is read with reference to the drawings attached hereto.

PREFERRED EMBODIMENTS OF THE INVENTION

Figure 1:
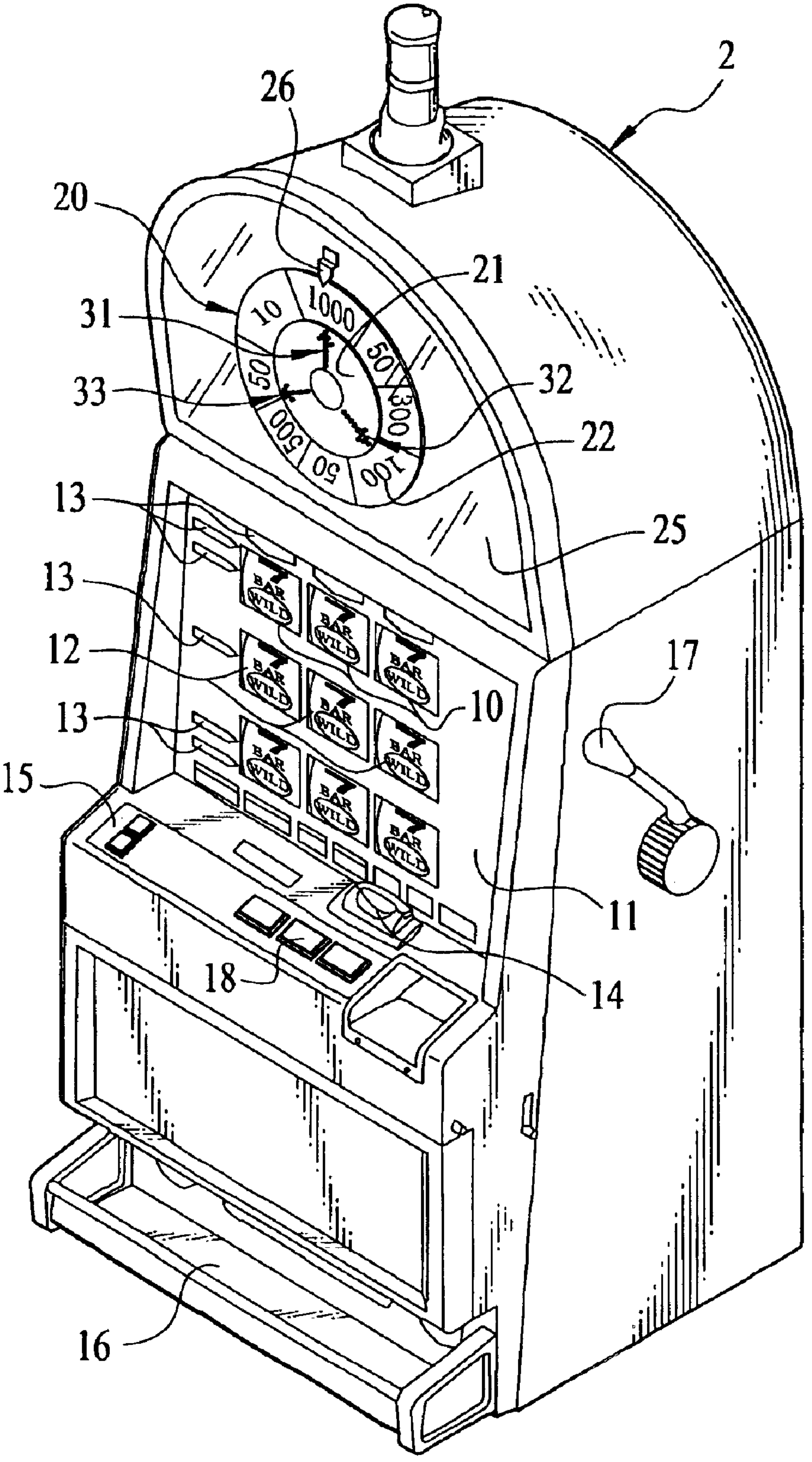
FIG. 1 is a perspective front view of a slot machine in which a symbol display device according to the first embodiment is mounted.

As shown in FIG. 1, a front panel 11 is provided in the center of a slot game machine 2. In the front panel 11, nine display windows 10 are arranged in 3×3 matrix. A reel unit is disposed behind each display window 10 so that three symbols in a vertical direction on rotatable reel 12 are observable through the display window 10. The player wins in a game if a predetermined symbol combination or a particular symbol appears on any of eight horizontal, vertical and diagonal winning lines. Note that the reference numerical 13 shows an indicator to indicate the winning line. A coin slot 14, an operation panel 15 and a coin tray 16 are provided below the front panel 11. A start lever 17 to start the game is attached to the lateral side of the slot machine 2.

There are a bet button 18 and a payout button in the operation panel 15. The bet button 18 is used for selecting the number of valid winning lines. For instance, one winning line is validated when one bet is selected, while eight winning lines are validated when maximum bet is selected. The game starts when the start lever 17 is operated after betting. After the reels 12 rotate to display the symbols in motion, each reel 12 stops automatically at a stop position that is predetermined by use of sampled random numbers. If the predetermined symbol combination or the predetermined symbol appears on any of the validated winning lines, dividend coins are dispensed to the coin tray 16. The amount of the dividend coins is determined based on the type of the win.

Figure 2:
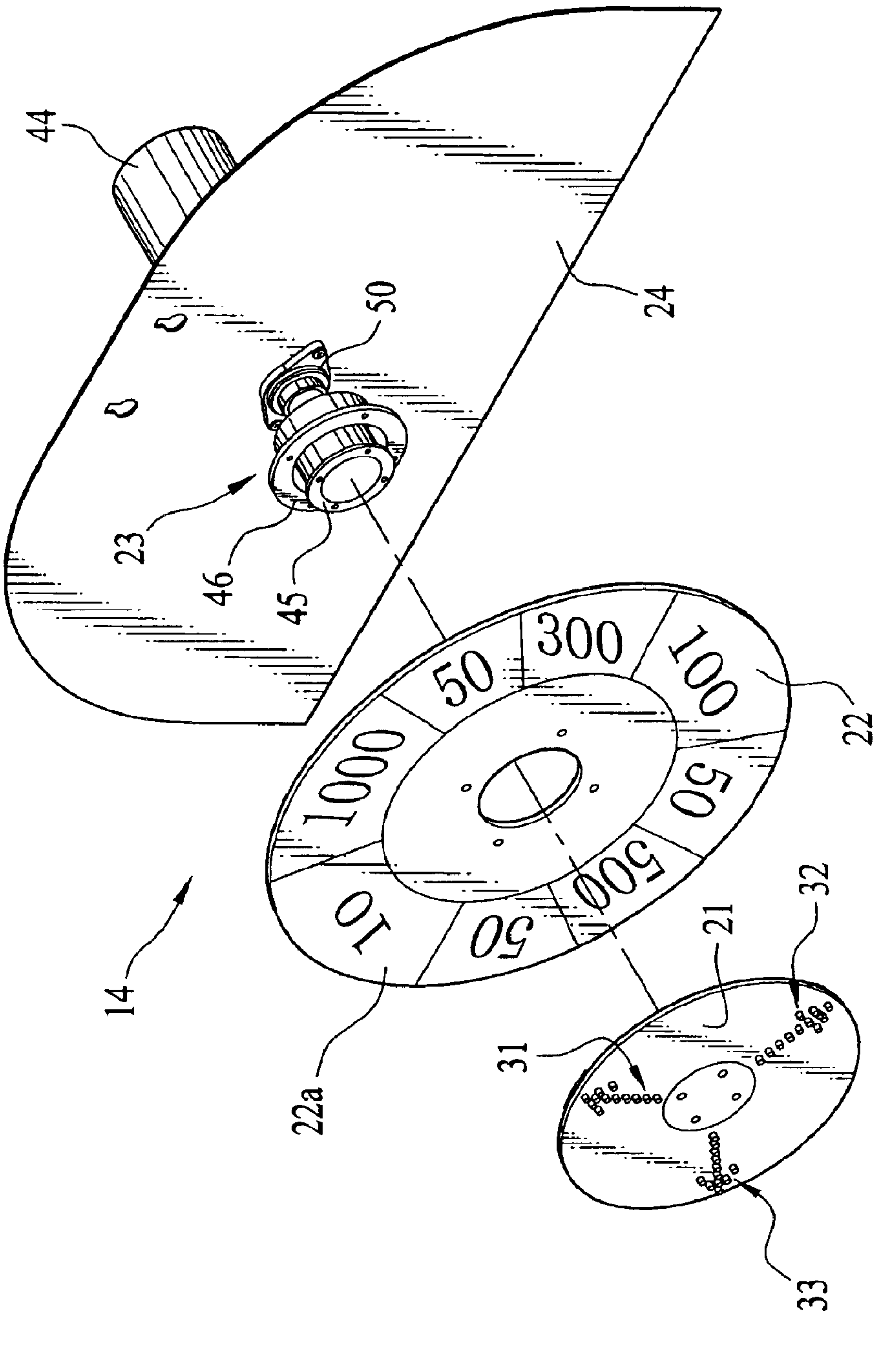
FIG. 2 is an exploded perspective view of the symbol display device.
Figure 3:
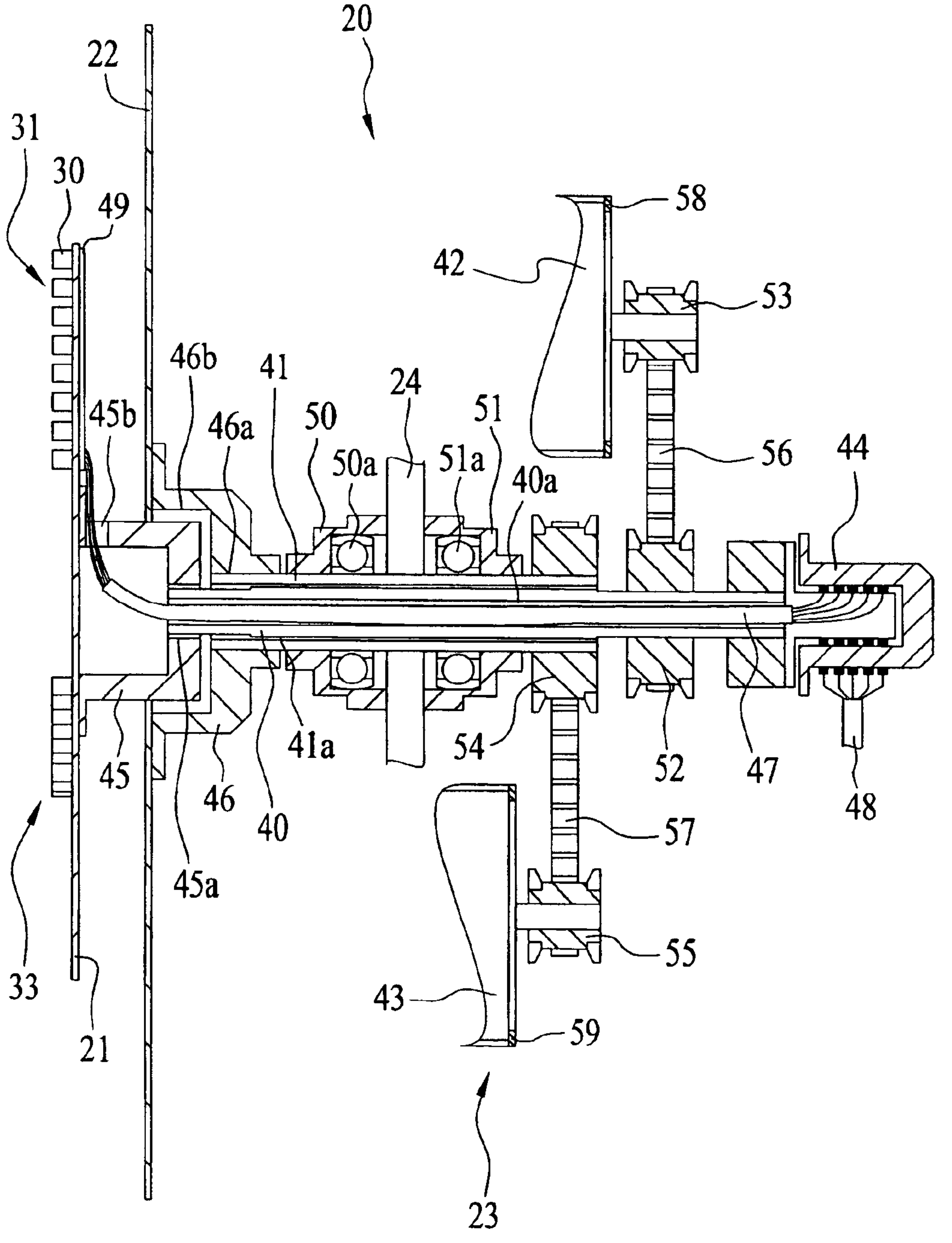
FIG. 3 is a cross-sectional view of the symbol display device.

A symbol display device 20 is mounted in the upper part of the slot game machine 2 and determines the amount of dividend coins when the player wins a free game (a game executed without betting) that is executed when a big trigger symbol appears on the winning line, for instance. As shown in FIGS. 2 and 3, the symbol display device 20 has a first display plate (rotator) 21, a second display plate 22, a display plate driver 23 and a support plate 24 that are mounted in the slot game machine 2. The symbol display device 20 is covered with a front panel 25 (see FIG. 1). Note that the symbol display device 20 may be operated not only when the player wins the free game.

The first display plate 21 is in the form of a disk, and the front side is provided with first-third light emission parts 31, 32 and 33 disposed with 120 degree rotational symmetry around a rotary center. Each of the first to third light emission parts 31, 32 and 33 has twelve light emitting diodes (LEDs) 30 arranged to form an arrow. The first display plate 21 is attached to a first flange 45 that is mechanically connected with a first rotary shaft 40, so that the first display plate 21 is driven to rotate by a first drive motor 42 of the display plate driver 23. When the first display plate 21 rotates, the first to third light emission parts 31, 32 and 33 are lighted on and off at predetermined timings to display messages or symbols based on afterimage effect. When the first display plate 21 stops rotating, one of the first to third light emission parts 31, 32 or 33 is lighted on, or all of the first to third light emission parts 31, 32 or 33 are lighted off. When one of the light emission parts 31, 32 or 33 is lighted on to indicate a number symbol on a display area 22*a* provided in the periphery of the second display plate 22, the indicated number represents a part of the amount of dividend coins. Note that the number and position of the emitting parts and the LEDs are not limited in the above embodiment but can be arranged appropriately.

In the front periphery of the second display plate 22, the display part 22*a* is provided with plural number symbols representing the amounts of dividend coins (10, 50, 100, 300, 500 and 1000) to be dispensed if the player wins the free game. The second display plate 22 has a larger diameter than the first display plate 21, so that the display part 22*a* does not overlap with the first display plate 21. The second display plate 22 is attached to a second flange 46 that is mechanically connected with a second rotary shaft 41, so that the second display plate is rotated by a second drive motor 43 of the display plate driver 23.

When the second display plate 22 stops rotating, one of the number symbol is indicated by an indicator 26 (see FIG. 1) located above the second display plate 22. The indicated number by the indicator 26 represents the number of dividend coins. In case when one of the first to third light emission parts 31 to 33 is lighted on, the number indicated by the lightened light emission part is added to the amount of the dividend coins. Note that characters, marks, colors, letters, blank symbols having no symbols may also be properly disposed in the display area 22*a*, although only the number symbols of dividend coins are provided in the embodiments.

The display plate driver 23 comprises the first rotary shaft 40, the second rotary shaft 41, the first drive motor 42, the second drive motor 43 and a slip ring 44. Each of the first and second rotary shafts 40, 41 has a cylindrical shape with a hollow part 40*a*, 41*a*. One end of the first rotary shaft 40 is fitted into an opening 45*a* formed in the first flange 45, so that the first rotary shaft 40 is fixed to the first flange 45. One end of the second rotary shaft 41 is fitted into an opening 46*a* of the second flange 46, so that the second rotary shaft 46 is fixed to the second flange 46. A packing is provided to prevent the dust from entering the hollow part 40*a*.

The first and second flanges 45, 46 are screwed to the rear surfaces of the first and second display plates 21, 22, respectively. A through hole 45*b* is formed in the first flange 45 to insert a harness 47, which is described later. A concave part 46*b* is formed in the second flange 46 to contain a part of the first flange 45.

The first rotary shaft 40 is inserted into the hollow part 41*a* of the second rotary shaft 41 and determined its position by bearings (not shown), which are attached to both ends of the second rotary shaft 41. Thereby, the first rotary shaft 40 and the second rotary shaft 41 are held concentrically, and so the first display plate 21 and the second display plate 22. The harness 47 is inserted into the hollow part 40*a* of the first rotary shaft 40, and electrically connects a harness 48 to a circuit board 49 that is implemented a control circuit to drive and control LEDs 30 of the first-third light emission parts 31, 32 and 33. The harness 48 is connected to CPU (not shown) to control the whole operations of the slot machine 2.

The second rotary shaft 41 is inserted into bearing members 50 and 51, which are mounted in predetermined positions of the support plate 24 to determine the position of the second rotary shaft 41. Note that the numerical 50*a* and 51*a* represent bearings to enable smooth rotation of the second rotary shaft 41.

The first rotary shaft 40 and the first drive motor 42 are respectively connected to pulleys 52, 53. A toothed belt 56 is put around the pulleys 52, 53 to transmit the rotation of the first drive motor 42 to the first rotary shaft 40. A toothed belt 57 is put around a pair of pulleys 54, 55 to transmit the rotation of the second drive motor 43 to the second rotary shaft 41. The first and second drive motors 42, 43 are respectively supported by the brackets 58, 59, and fixed to the rear side of the support plate 24.

Though not shown in the drawings, position detecting sensors are mounted on the first and the second rotary shafts 40 and 41 to detect the rotation of the first and the second display plates by 360 degrees. There are counters to count the drive pulses to the first and second drive motors 42, 43. Since the rotational amount of the display plates by a single pulse of the first and second drive motors 42, 43, it is possible to detect the rotational position of the first to third light emission parts 31 to 33. Accordingly, it is possible to detect the number symbol indicated by the indicator 26 and the first to third light emission parts 31 to 33.

Since the mechanical parts of the display plate driver 23 are mounted on both sides of the support plate 24, it is possible to make the symbol display device 20 compact. Moreover, the workability is improved, since the symbol display device 20 may be easily mounted in the slot machine 2 only by mounting the support plate 24, whereon the display driving part 23 is mounted, in a predetermined position.

Figure 4:
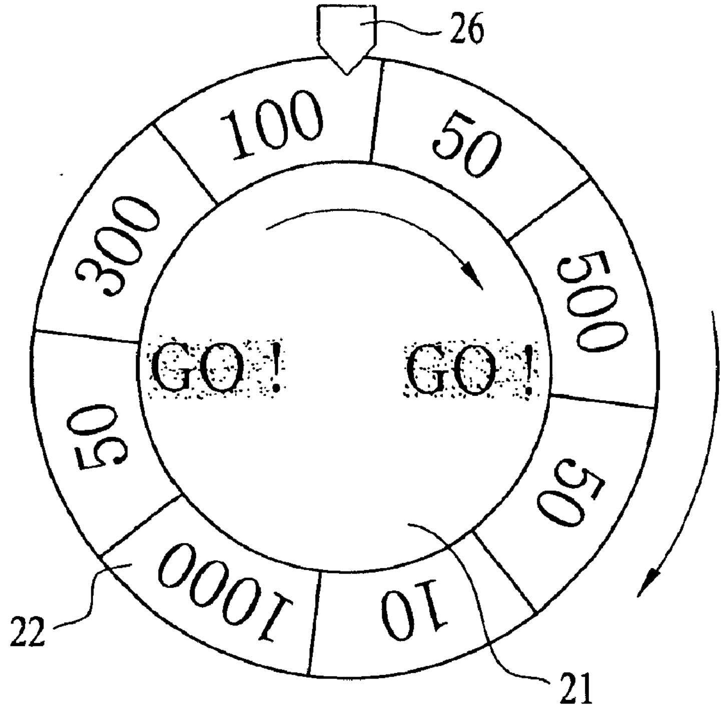
FIG. 4 is a front view of the symbol display device in which an LED array displays messages in a game by utilizing afterimage effect.

The operation of the symbol display device 20 described above is explained. When the player wins the free game, the first and second display plates 21, 22 begin to rotate clockwise (shown by the arrows in FIG. 4). When the rotational speed of the first display plate 21 reaches a predetermined speed, the LEDs 30 of each of the first-third light emission parts 31, 32 and 33 are lighted on and off at predetermined timings. Thereby, messages are displayed in the first display plates 21 by use of afterimage effect. In an example shown in FIG. 4, the message "GO! GO!" by afterimage effect is displayed while the first and second display plates 21, 22 are rotating. The message in the first display plate 21 improves the display effect in the game. Note that the rotational directions of the first and the second display plates 21 and 22 are not limited in the above embodiment, but they may rotate in opposite directions.

Figure 6:
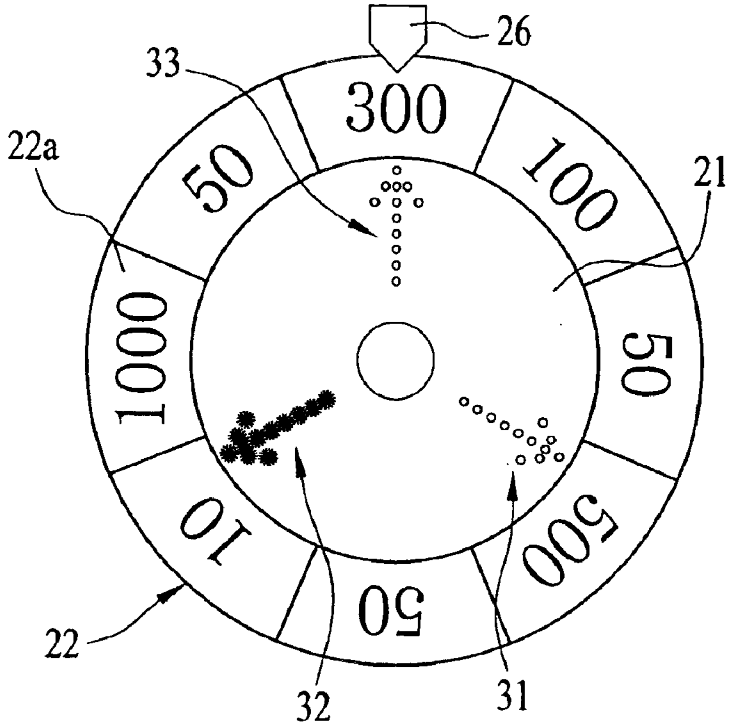
FIG. 6 is a front view of the symbol display device with an LED array of a second light emission part is lighted on after a first display plate and a second display plate stop rotating.
Figure 7:
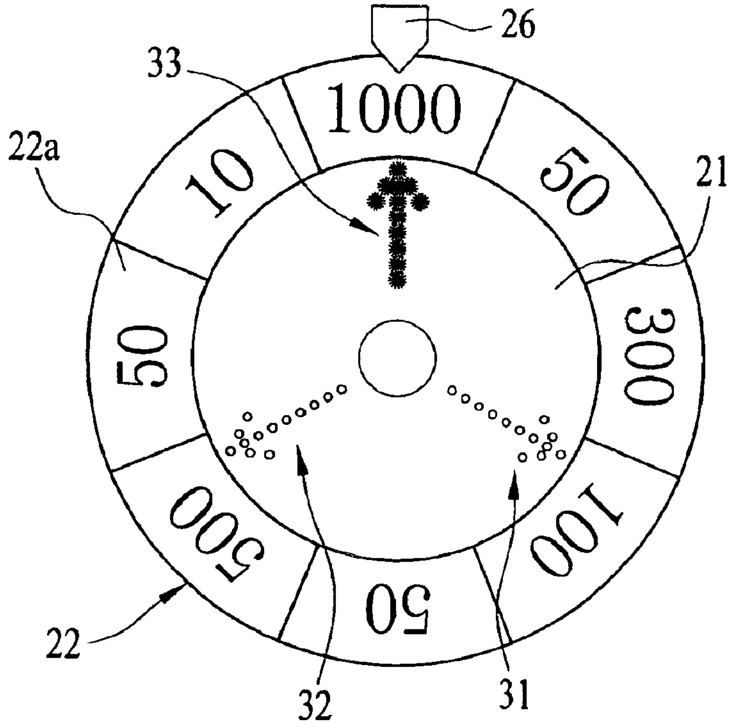
FIG. 7 is a front view of the symbol display device with an LED array of a third light emission part is lighted on after a first display plate and a second display plate stop rotating.

After a predetermined time has elapsed since the rotation, the first and second display plates 21, 22 stop rotating so that the message (afterimage) in the first display plate 21 disappears. Then, the following process is repeated: the first light emission part 31 is lighted on (see FIG. 5) and then off (see FIG. 8), the second light emission part 32 is lighted on (see FIG. 6) and then off (see FIG. 8), and the third light emission part 33 is lighted on (see FIG. 7) and then off (see FIG. 8). Thereby, it is possible to display as if an indication arrow is rotating.

Figure 5:
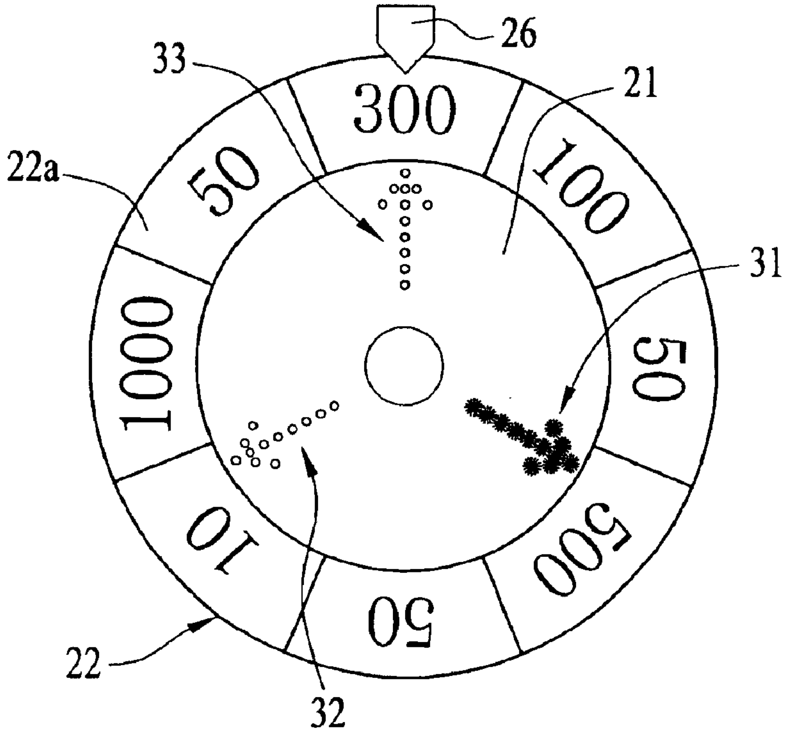
FIG. 5 is a front view of the symbol display device with an LED array of a first light emission part is lighted on after a first display plate and a second display plate stop rotating.
Figure 8:
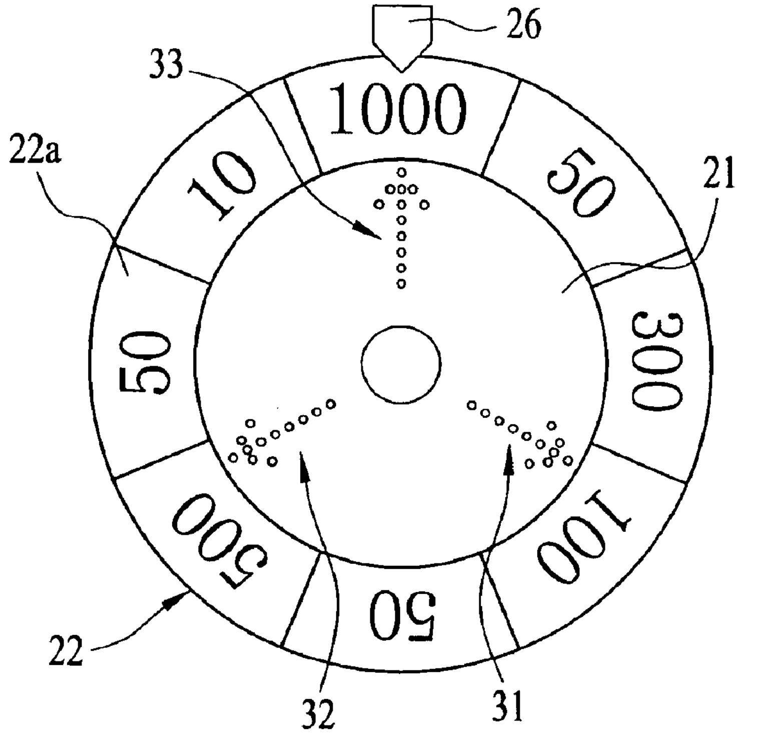
FIG. 8 is a front view of the symbol display device with the LED arrays of first to third light emission parts are lighted off.

Subsequently, the above processes finish in a state where one of the first to third light emission parts 31, 32 or 33 is lighted on, or all of them are light off. If one of them is lighted on and indicates a number symbol in the display part 22*a*, the number in the number symbol indicated by the lighted light emission part is added to the number indicated by the indicator 26 as the amount of dividend coins. For instance, as shown in FIG. 5, when the first light emission part 31 is lighted on and indicates the number symbol "500", and when the indicator 26 indicates the number symbol "300", the player gets 800 coins as the dividend coins. As shown in FIG. 8, when the first to third light emission parts 31, 32 and 33 are not light on, and when the indicator 26 indicates the number symbol "1000", the player gets 1000 coins as the dividend coins.

Note that the order to light on the first to third light emission parts 31, 32 and 33 is not limited to the above embodiment. In addition, though one of the first to third light emission parts 31, 32 and 33 is lighted on in the above embodiment, it is possible to light on two or all of the light emission parts simultaneously. In that case, the sum of the indicated numbers is added to the amount of the dividend coins.

Figure 9:
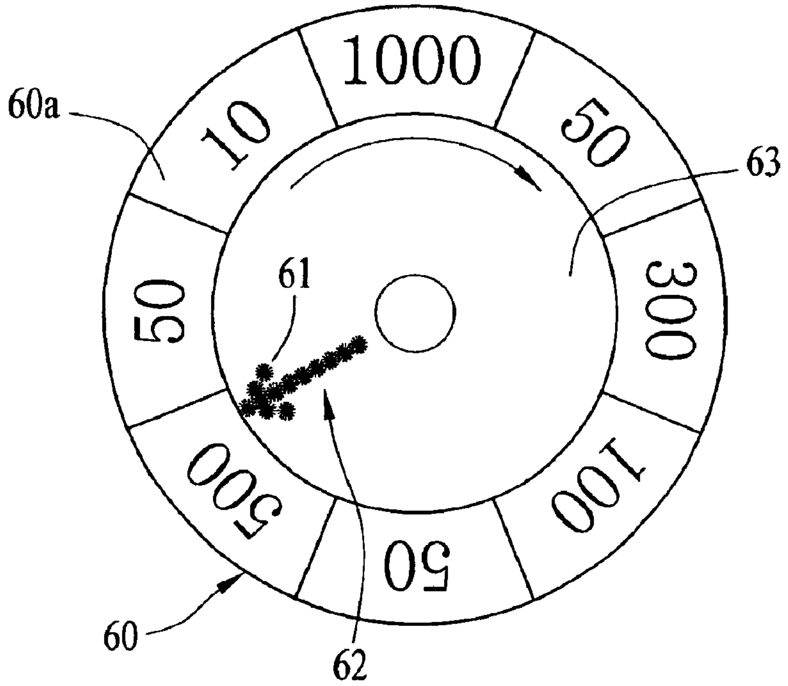
FIG. 9 is a front view of the symbol display device according to the second embodiment in which only a first display plate having an LED array is rotating in the game.
Figure 10:
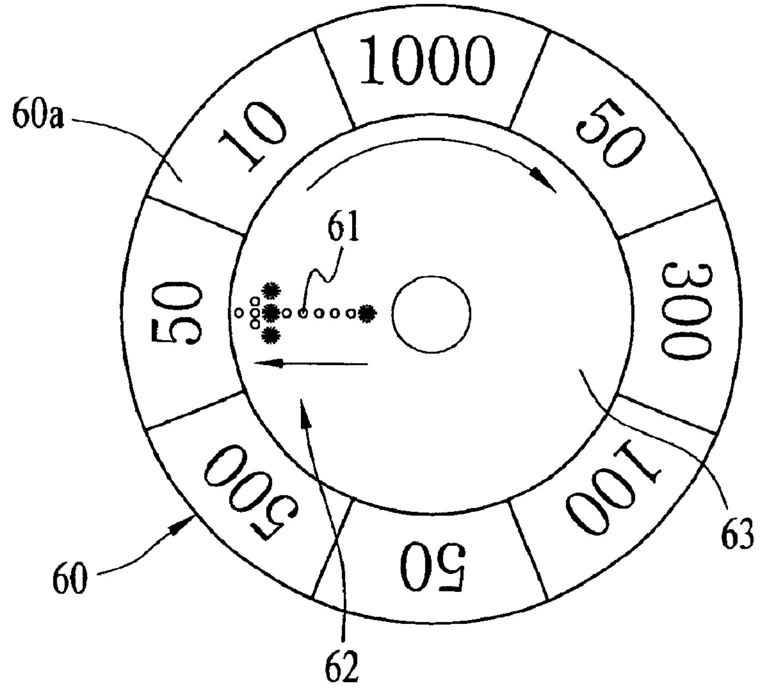
FIG. 10 is a front view of the symbol display device in which the first display plate stops rotating.

The present invention does not limit the above embodiment in which the first display plate 21 with the light emission parts and the second display plate 22 with the number symbols are individually rotated. FIG. 9 shows the second embodiment in which only a first display plate 63 with a light emission part 62, composed of LEDs 61, rotates clockwise (the direction shown by the arrow in the drawing). In this embodiment, a second display plate 60 with a symbol display part 60*a* is fixed. While the first display plate 63 rotates in the game, the light emission part 62 is lighted on and off to display the message or symbols by utilizing afterimage effect. After the first display plate 63 stops rotation, the amount of dividend coins is determined by lighting on or off the light emission part 62. If the light emission part 62 is kept the light on after the first display plate 63 stops rotation, the number indicated by the light emission part 62 represents the amount of the dividend coins. For the purpose of indicating the number symbol clearly and improving the display effect, it is preferable to light on and off the LEDs 61 sequentially from the center to the outer periphery, as shown in FIG. 10. On the other hand, if the light emission part 62 is lighted off after the first display plate 63 stops rotation, the player can not get a dividend coin.

In addition, the present invention may also be applied to a game machine that has plural display plates with display areas. According to the third embodiment shown in FIG. 11, the symbol display device has first, second and third display plates 70, 71 and 72. A light emission part 74, wherein LEDs 73 are provided, is in the front surface of the first display plate 70, while display areas 71*a*, 72*a* carrying number symbols are provided on the peripheries of the second and the third display plates 71, 72.

Figure 11:
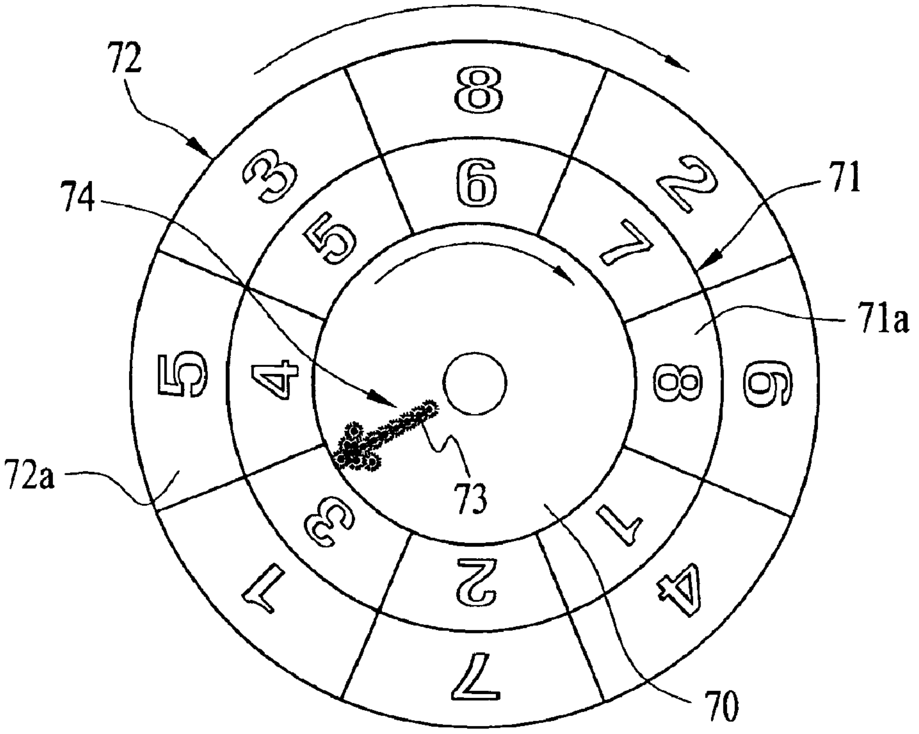
FIG. 11 is a front view of the symbol display device according to the third embodiment in which first, second and third display plates are rotating in the game.
Figure 12:
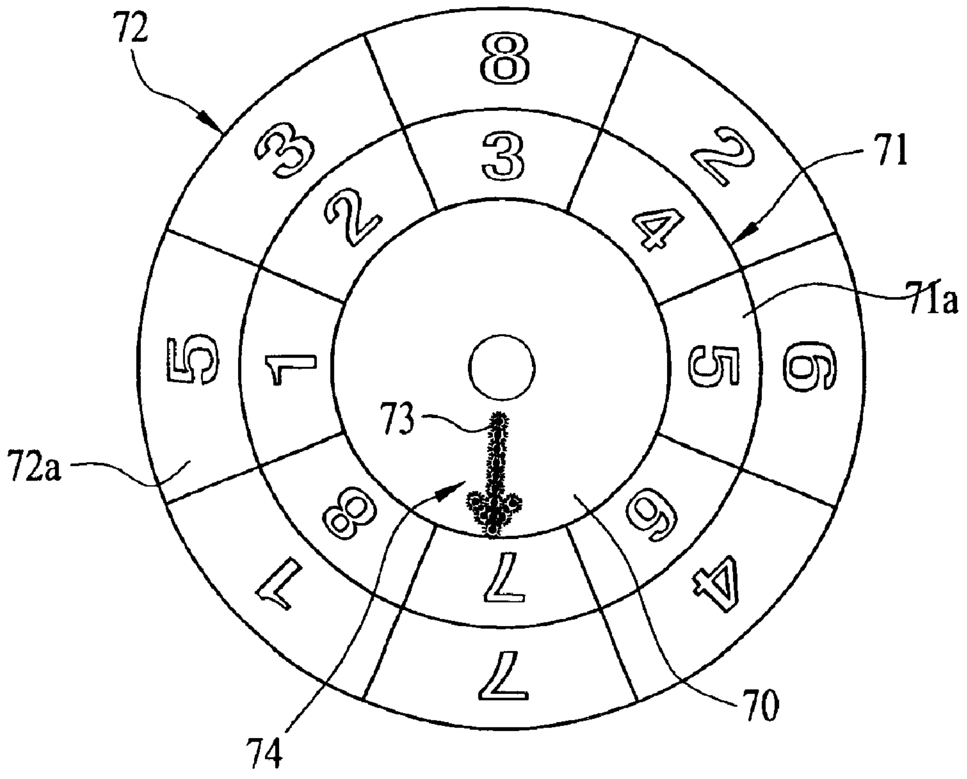
FIG. 12 is a front view of the symbol display device in which the first, second and third display plates stop rotating.

As shown in FIG. 11, on starting the game, the symbol display device starts its operation and rotates the first to third display plates. During the rotation, the LEDs 73 of the light emission parts 74 light on and off to display messages or symbols by utilizing afterimage effect. Then, the third display plate 72, the second display plate 71 and the first display plate 70 stop the rotation in the order mentioned. The winning type is determined in accordance with the symbol combination of the second and third display plate 71, 72 indicated by the lighted light emission part 74 of the first display plate 70. For example, the player wins the game and a predetermined amount of coins are dispensed if the light emission part 74, in which all LEDs 73 light on, indicates the symbols "7" on the second and the third display plates 71 and 72 at the same time. In other words, when the light emission part 74 lights on, the light emission part 74 is used as any number symbol in determining the winning symbol combination. On the other hand, when the light emission part 74 is not lighted on, the player loses the game. Note that the LEDs 73 may represent different symbols as well, by arranging the way of lighting each of them.

Figure 13:
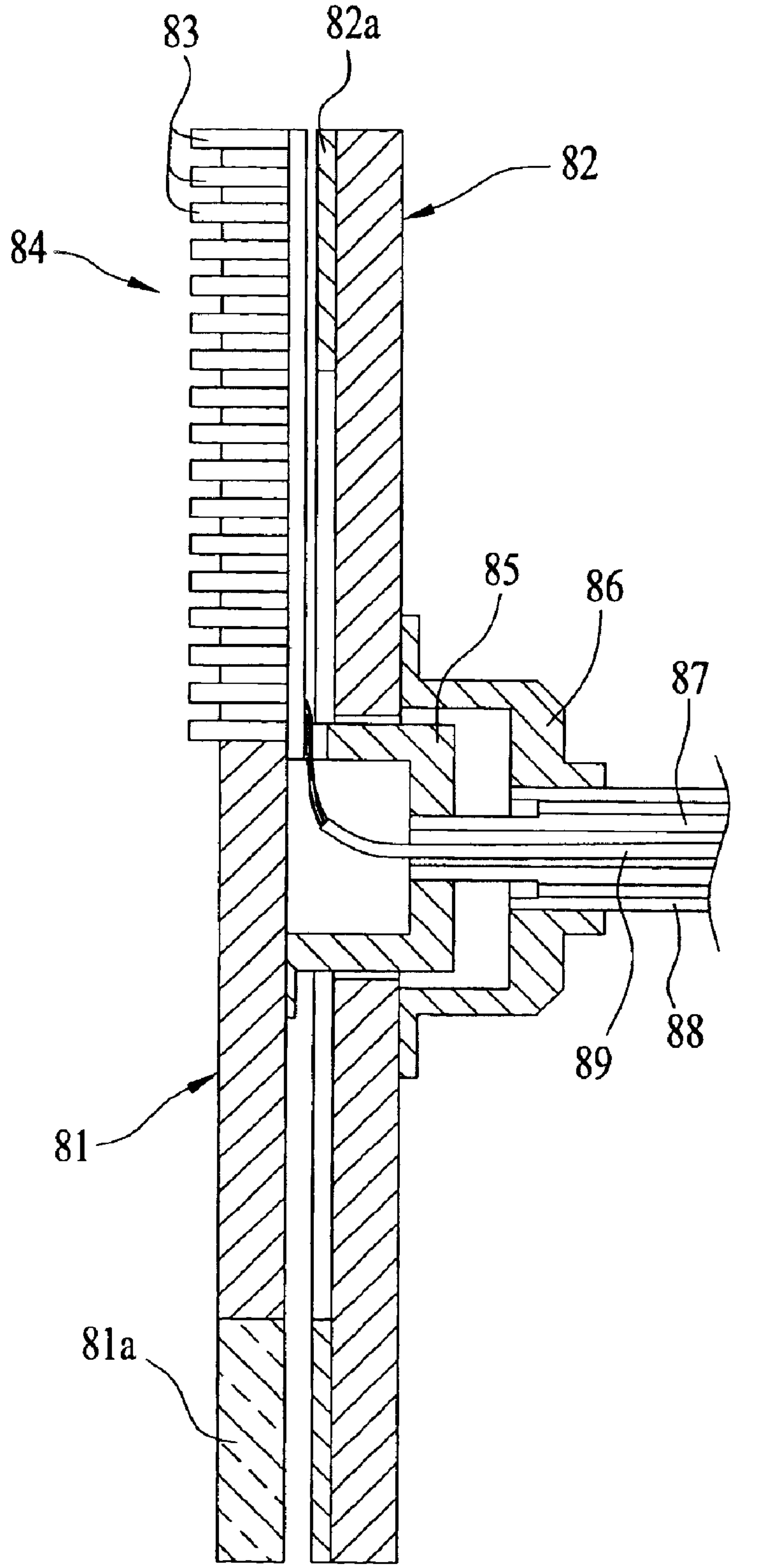
FIG. 13 is a cross-sectional view of a symbol display device according to the fourth embodiment, in which a first display plate with an LED array has the same size as a second display plate with symbols.
Figure 14:
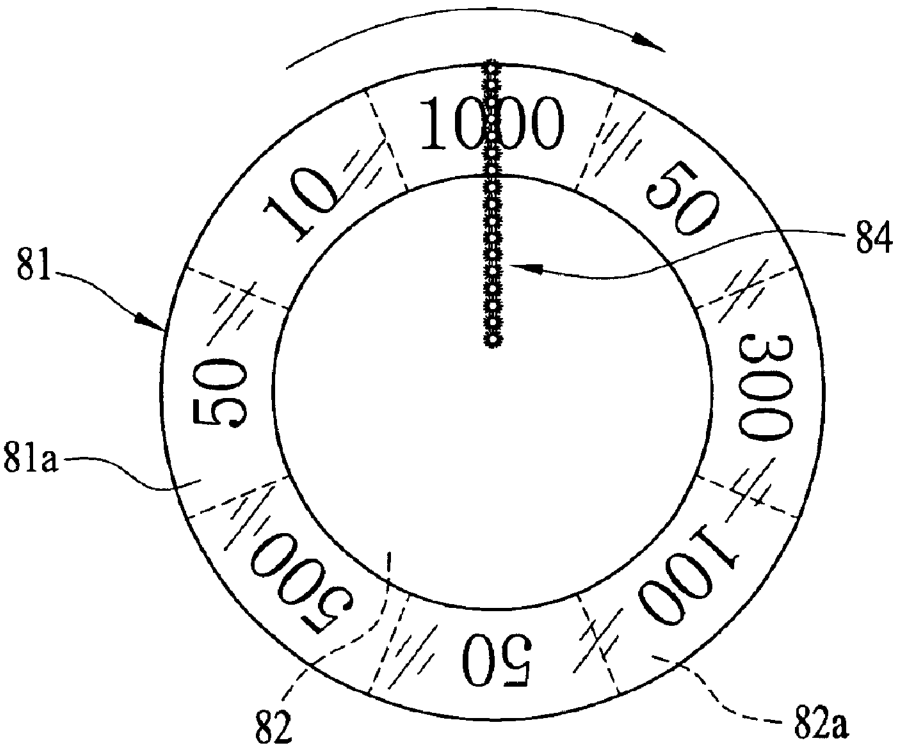
FIG. 14 is a front view of the symbol display device in which the first display plate is rotating in the game.
Figure 15:
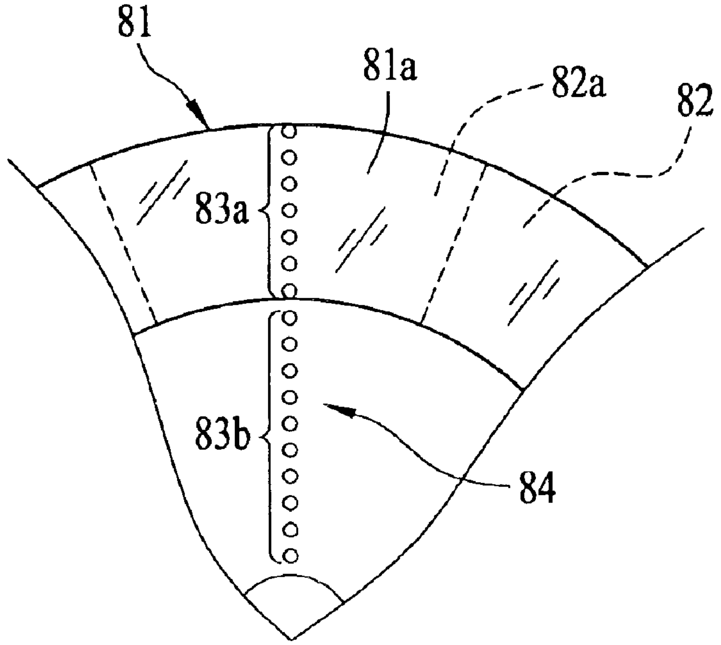
FIG. 15 is a partial front view of the symbol display device in which the first display plate stops rotating.

Though two display plates (first and second display plates) having different diameters are used in the above embodiment, the two display plates may have the same diameter as well. In the fourth embodiment shown in FIG. 13, the symbol display device is composed of a first display plate 81 and a second display plate 82, which have the same diameter. There is a display area 82*a* in the periphery of the second display plate 82. At least the part of the first display plate 81 overlapping with the display area 82*a* of the second display plate 82 (shown by the reference numerical 81*a* in the drawing) is made of a transparent material such as acrylic. At the front surface of the part 81*a* is provided with a light emission part 84 in which plural LEDs 83 are arranged. As shown in FIG. 14, all LEDs 83 are used to show the symbols or messages by utilizing afterimage effect while the first display plate 81 is rotating. In FIG. 15, the light emission part 84 is divided into a first LED group 83*a* overlapping with the display area 82*a*, and a second LED group 83*b* that is not overlapped with the display area 82*a*. One of the LED group is lighted on when the first display plate 81 stops rotating. Note that the reference numerals 85, 86 in FIG. 13 represent flanges, reference numerals 87, 88 represent rotary shafts, and the reference numeral 89 represents a harness.

Figure 16:
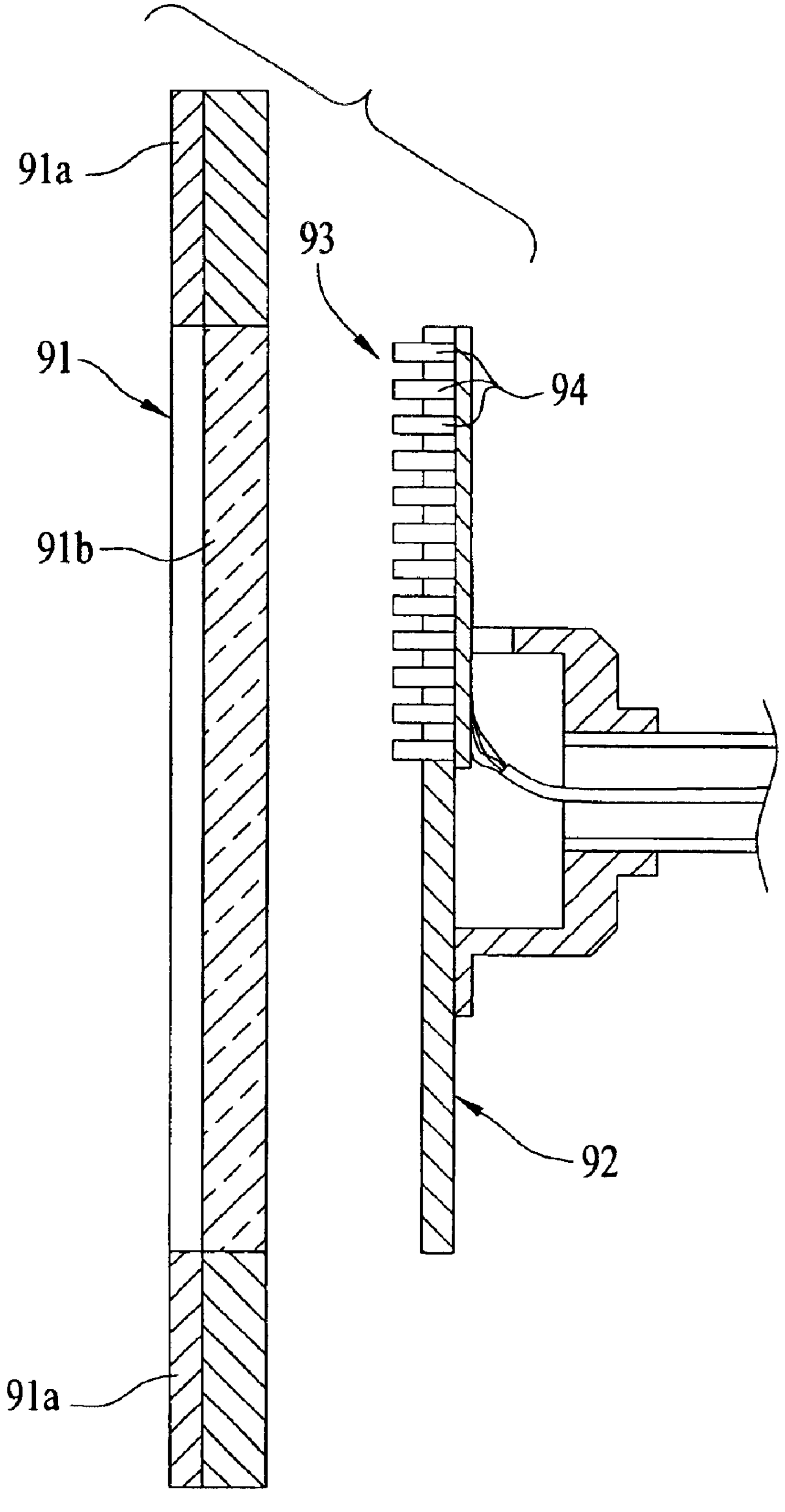
FIG. 16 is a cross-sectional view of a symbol display device according to the fifth embodiment in which a first display plate with symbols is placed in front of a second display plate with an LED array.
Figure 17:
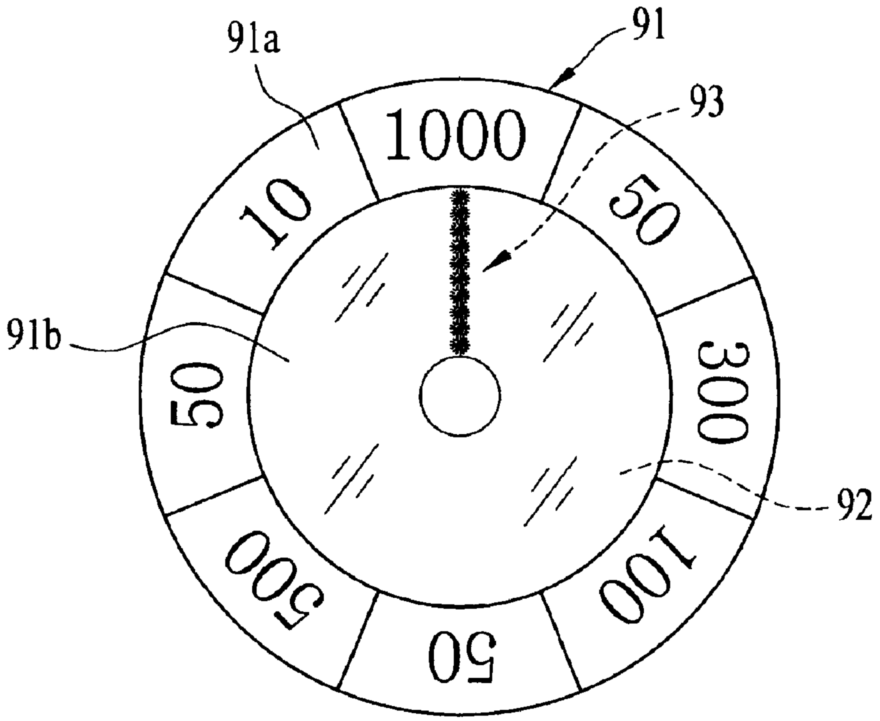
FIG. 17 is a front view of the symbol display device in which the second display plate stops rotating.

FIGS. 16, 17 show the fifth embodiment in which a second display plate 92 with a light emission part 93 is located behind a first display plate 91 with a symbol display area 91*a*. The first display plate 91 has a transparent area 91*b*, made of a transparent material such as acrylic, which overlaps the second display plate 92. The second display plate 92 has the light emission part 93 on which plural LEDs 94 are arranged so as not to overlap with the display area 91*a* of the first display plate 91. During the rotation of the second display plate 92, the light emission part 93 displays symbols or messages through the transparent area 91*b* by utilizing afterimage effect.

Figure 18:
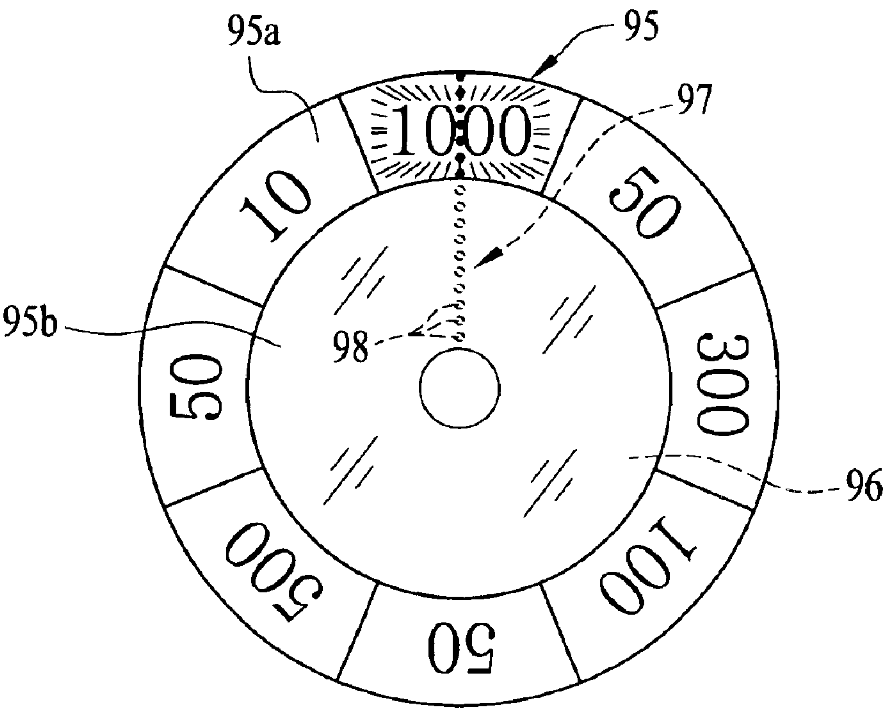
FIG. 18 is a front view of a symbol display device according to the sixth embodiment in which a first display plate with symbols has the same size as a second display plate with an LED array.

In the sixth embodiment, shown in FIG. 18, a first display plate 95 and a second display plate 96 have the same diameter. The first display plate 95 is made of a transparent material such as acrylic. A display area 95*a* is formed by putting a transparent or translucent label on the periphery of the second display plate 96, or printing symbols on the first display plate 95. The second display plate 96 has a light emission part 97 in which plural LEDs 98 are arranged from the center to the periphery of the second display plate 96, so that the light emission part 97 is partially overlapped with the display area 95*a*. While the second display plate 96 is rotating, the symbol display device lights on and off the LEDs 98 behind an area 95*b* provided inside the display area 95*a* of the first display plate 95, so that the patterns or messages are displayed by utilizing afterimage effect. When the second display plate 96 stops, a symbol on the display area 95*a* is lighted up by the LEDs 98 that are overlapped with the display area 95*a*.

Figure 19:
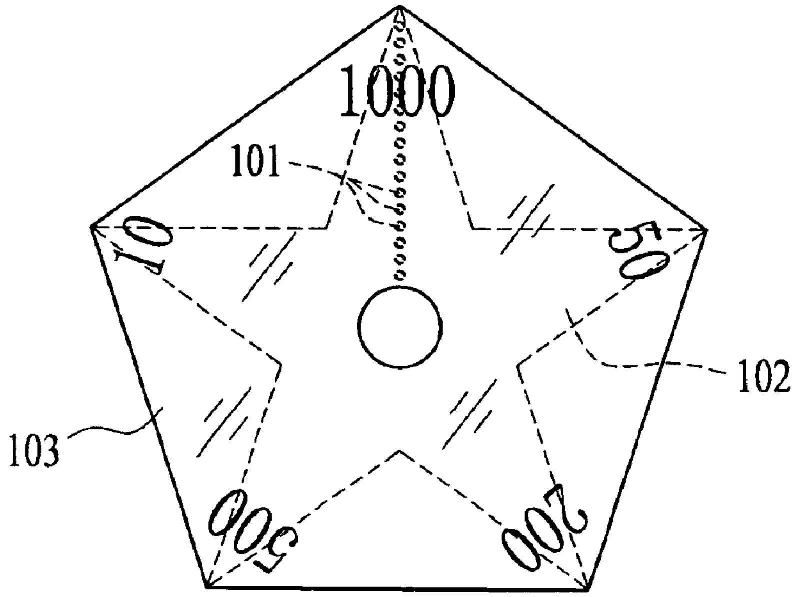
FIG. 19 is a front view of a symbol display device according to the seventh embodiment in which a display plate with symbols and a display plate with an LED array have different shapes.

FIG. 19 shows the seventh embodiment in which a first display plate 102 and a second display plate 103 have different shapes. Plural LEDs 101 are arranged on the star-shaped first display plate 102. The second display plate 103 has a pentagonal shape, and number symbols to show the amount of dividend coins are disposed at the corners of the second display plate 103.

Figure 20:
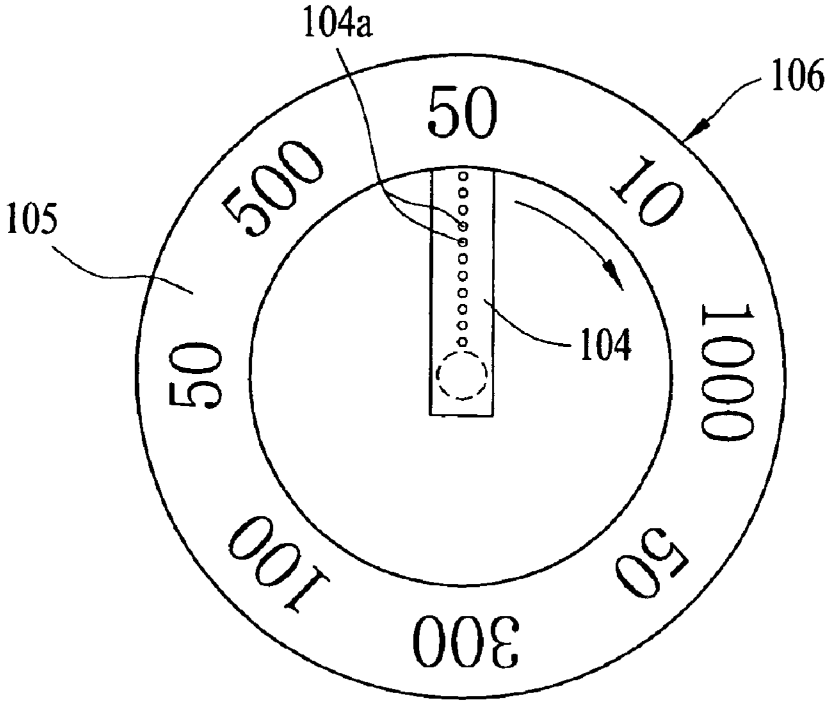
FIG. 20 is a front view of a symbol display device according to the eighth embodiment in which a display plate with an LED array has a rectangular shape.

In the eighth embodiment, shown in FIG. 20, the symbol display device has a light emission member 104 and a display plate 106 on which a display area with symbols are provided. The light emission member 104 has a rectangular shape, and is rotatable around the center of the display plate 106. During the rotation of the light emission member 104, plural LEDs 104*a* light on and off to display messages or patterns by utilizing afterimage effect.

Figure 21:
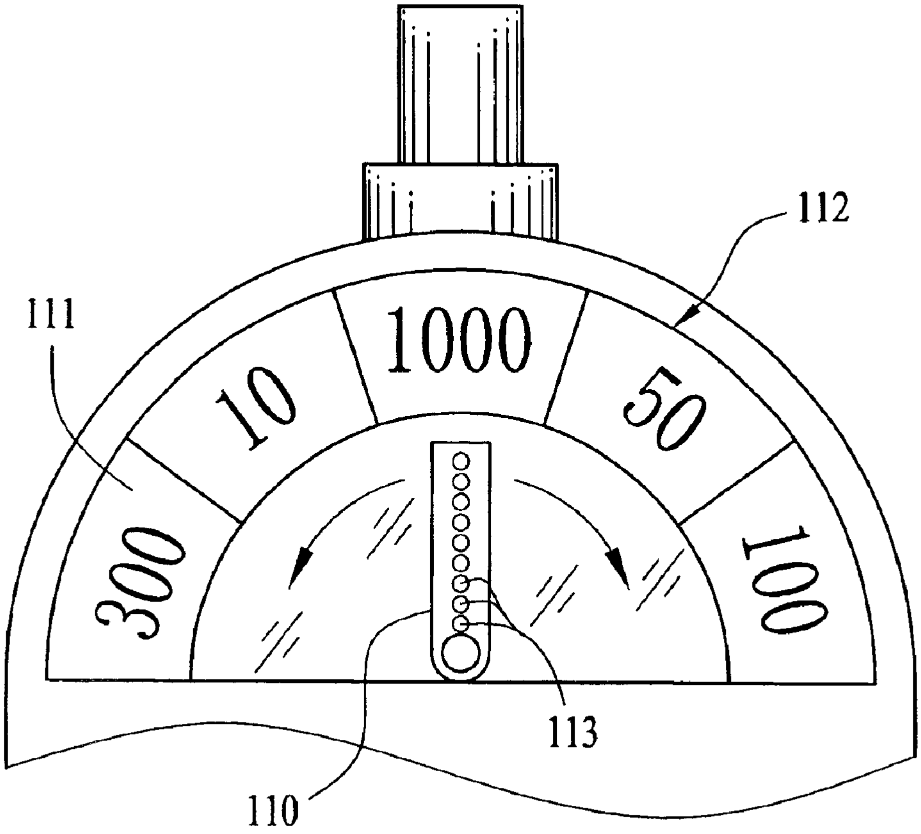
FIG. 21 is a front view of a symbol display device according to the ninth embodiment in which a display plate with an LED array swings clockwise and counterclockwise.

It is not necessary to rotate the light emission member by 360 degrees to display messages or patterns by utilizing afterimage effect. In the ninth embodiment, shown in FIG. 21, a rectangular display plate 110 repeats swinging in a predetermined angle range while lighting plural LEDs 113 on and off to display messages or patterns through a front window 112 by utilizing afterimage effect. It is preferable to provide a display area 111 with number symbols with the front window 112.

Although the LEDs are disposed to form an arrow in the above embodiments, the arrangement of the LEDs is not limited to the above embodiments but they may be arranged into two or more rows disposed from the center to the normal direction. In this case, the LEDs can display more complicated and vivid images by utilizing afterimage effect during the rotation of the rotator. Moreover, the LEDs can display a variety of indicators and symbols when the rotator stops. Furthermore, by using plural colors of LEDs, they may provide a colorful displays patterns. The symbols formed by the LEDs are not limited in the above described messages, but various characters and animations may be displayed by controlling the lighting patterns of the LEDs.

The symbol display device is mounted in the slot machine 2 in the above embodiments. However, the symbol display device may be mounted in other game machines such as a roulette game machine and a Pachinko machine. Alternatively, the symbol display device of the present invention alone may be used as a game machine itself.

Various changes and modifications are possible in the present invention and may be understood to be within the present invention.

What is claimed is:

1. A symbol display device for a game machine, comprising:

at least one symbol display member with, on a first side, a symbol area having plural symbols thereon;

a rotary member overlapped with the symbol display member; and on a first side of the rotary member, at least one light emission element array, each light emission element array having plural light emission elements, wherein, when the rotary member stops rotating, the light emission elements of the at least one light emission element array are lighted on to indicate one symbol of the symbol display member and/or to display a specific symbol.

2. The symbol display device according to claim 1, wherein the symbol display member rotates when the rotary member is rotating.

3. The symbol display device according to claim 1, wherein the light emission element array is provided in an area that does not overlap with the symbol area.

4. The symbol display device according to claim 3, wherein plural light emission element arrays are arranged on the rotary member such that each of the light emission element array extends radially to indicate the symbol in the symbol area;

wherein the light emission element arrays turn the light on and off sequentially when the rotary member stops rotation.

5. The symbol display device according to claim 3, wherein the symbol display member is composed of the symbol area and a transparent area, and the rotary member is placed behind the symbol display member such that the light emission element array is overlapped with the transparent area.

6. The symbol display device according to claim 1, wherein the light emission element array is partially overlapped with the symbol area.

7. The symbol display device according to claim 6, wherein the light emission elements are divided into a first light emission element group that overlaps the symbol area and a second light emission element group that does not overlap the symbol area;

wherein all of the light emission elements light on and off to display symbols or messages while the rotary member is rotating, and the first light emission element groups or the second light emission element group is lighted on when the rotary member stops rotating.

8. The symbol display device according to claim 7, wherein the symbol display member is composed of the symbol area and a transparent area, and the rotary member is placed behind the symbol display member such that the second light emission element group is overlapped with the transparent area.

9. The symbol display device according to claim 1, wherein the symbol display member and the rotary member have different shapes.

10. The symbol display device according to claim 9, wherein the rotary member has a rectangular shape.

11. The symbol display device according to claim 10, wherein the rotary member swings clockwise and counterclockwise within a predetermined angle.

12. The device of claim 1, wherein, the light emission elements are lighted on and off to display symbols or messages by utilizing afterimage effect while the rotary member is rotating.

13. The device of claim 1, wherein the plural light emission elements of the at least one light emission element array are each light emitting diodes formed in a light emitting diode array.

14. A symbol display device for a game machine, comprising:

a symbol display member with a symbol area, having plural symbols thereon, and a transparent area;

a rotary member placed behind the symbol display member; and at least one light emission element located on the rotary member such that a portion of the light emission element overlaps the symbol area and another portion of the light emission element does not overlap the symbol area, the at least one light emission element being lighted on when the rotary member stops rotating.

15. The device of claim 14, the at least one light emission element is located on the rotary member such that the portion of the light emission element overlaps the symbol area and the another portion of the light emission element overlaps the transparent area.

16. The device of claim 14, wherein, the light emission elements are lighted on and off to display symbols or messages by utilizing afterimage effect while the rotary member is rotating.

17. The device of claim 14, wherein the light emission element comprises a light emitting diode array.

18. A symbol display device for a game machine, comprising:

a symbol display member with a symbol area, having plural symbols thereon, and a transparent area;

a rotary member adjacent the symbol display member; and a light emission element located on the rotary member, the light emission element having a first portion that overlaps the symbol area and a second portion that does not overlap the symbol area, wherein only one of the first portion and the second portion is lighted on when the rotary member stops rotating.

19. The device of claim 18, wherein the first portion overlaps the symbol area and the second portion overlaps the transparent area.

20. The device of claim 18, wherein, the light emission elements are lighted on and off to display symbols or messages by utilizing afterimage effect while the rotary member is rotating.

* * * * *